Patented Feb. 5, 1946

2,394,243

UNITED STATES PATENT OFFICE 2,394,243

PROCESS FOR POLYMERIZING TETRAFLUOROETHYLENE

Robert M. Joyce, Jr., Marshallton, Del., assignor to E. I. du Pont de Nemours & Company, Wilmington, Del., a corporation of Delaware No Drawing. Application July 23, 1942, Serial No. 452,080

3 Claims. (Cl. 260—80)

This invention relates to an improved process for polymerizing tetrafluoroethylene.

This invention has as an object a new and improved method for polymerizing tetrafluoroethylene. A further object is a process for polymerizing tetrafluoroethylene with high yields by means of a catalyst of a kind which will not undesirably affect the purity of the product obtained. Other objects will appear hereinafter.

The above objects are accomplished by heating tetrafluoroethylene with oxygen or an organic peroxy compound as catalyst under certain reaction conditions which in the best embodiment of the invention consist in carrying out the polymerization in the presence of water, and preferably in the presence of a dilute alkaline medium, at a pressure of at least 1000 lbs./sq. in. and at a temperature in the range 75°–160° C.

I have discovered that a markedly higher yield of the polymerized product in a relatively short period of time, as compared to the time yield heretofore realized, as for example in U. S. Patent 2,230,654, is obtained by the procedure outlined above.

The advantages presented by this invention are particularly outstanding when the process is operated in the presence of oxygen as the catalyst. The discovery that molecular oxygen will catalyze the polymerization of tetrafluoroethylene under the above conditions with remarkable efficiency provides as economical and commercially practicable process for obtaining polytetrafluoroethylene.

An efficient method for carrying out the invention is illustrated by the following preferred procedure: A high pressure metal reactor equipped with means for agitating the reactants is partially filled with 5% aqueous sodium hydroxide solution, evacuated, and sufficient tetrafluoroethylene is then charged so that its partial pressure at reaction temperature is greater than 1000 lbs./sq. in., 1000 to 4000 lbs./sq. in. being a convenient range. Oxygen equivalent to about 0.06 weight per cent based on tetrafluoroethylene is then charged. The reactor is agitated and heated at 80°–150° C. for about 4 hours to effect polymerization. The course of the reaction can be followed by observing the pressure decrease. When the pressure drop ceases, the reactor is cooled, the pressure is released, and the polytetrafluoroethylene is obtained as a granular white solid.

The following examples are further illustrative of the practice of this invention.

*Example I*

A silver lined, high pressure reactor is charged one-quarter full with 100 parts of 5% aqueous sodium hydroxide, it is then evacuated and charged with 200 parts of tetrafluoroethylene, and oxygen is added equivalent to a partial pressure of ¼ atmosphere. This amounts to 0.096 part of oxygen or 0.048 per cent based on tetrafluoroethylene. The reactor is heated to 148°–151° for 8 hours, the pressure dropping from an initial value of 2200 lbs./sq. in. to 1600 lbs./sq. in. The reactor is cooled, the pressure released, and the product discharged. There is obtained 82 parts of white granular polytetrafluoroethylene.

This polymer is insoluble in all organic and inorganic solvents; it is not dissolved, attacked, or swelled by such materials as concentrated nitric acid, concentrated hydrochloric acid, concentrated sulfuric acid, hydrofluoric acid, or concentrated aqueous caustic. Thin, flexible, semi-transparent films may be prepared by subjecting it to about 400 lbs./sq. in. pressure at 400° C., followed by quenching in cold water. These films are very tough, have tensile strengths of the order of 2500 lbs./sq. in., and furthermore do not become brittle even at the temperature of dry ice-methanol bath (−78° C.).

The aqueous solution resulting from the above polymerization is essentially neutral and contains considerable quantities of fluoride ion as sodium fluoride. Sodium difluoroacetate can also be obtained from this solution by precipitating the fluoride as calcium fluoride, evaporating the filtrate to dryness, and extracting with absolute alcohol. Sodium difluoroacetate crystallizes from the alcohol solution in lustrous plates.

*Example II*

A silver lined, high pressure reactor is charged one-quarter full with 100 parts of water, closed, evacuated, and then charged with 166 parts of tetrafluoroethylene. There is then added oxygen equivalent to a partial pressure of 1 atmosphere, corresponding to 0.384 part of oxygen, or 0.23 per cent based on tetrafluoroethylene. The reactor is agitated and heated at 100°–106° for 8 hours, the pressure falling from 1550 lbs./sq. in. to 1150 lbs./sq. in. There is obtained 44 parts of white granular polytetrafluoroethylene. The aqueous solution from this reaction mixture is acid to Congo red (pH less than 4) and contains considerable quantities of fluoride ion.

*Example III*

A silver lined, high pressure reactor is charged one-quarter full with 100 parts of water, closed, and without evacuating there is added 100 parts of tetrafluoroethylene. The reactor is then heated to 200° C., which brings the internal pressure to 1600 lbs./sq. in., the oxygen, which was in the shaker tube prior to loading serving as catalyst. After heating for 8 hours there is obtained 3 parts of white granular polytetrafluoroethylene.

*Example IV*

A silver lined, high pressure reactor is charged with 100 parts of water, 0.2 part of benzoyl peroxide, and the pH is adjusted to 3.3 by the addition of one drop of 2 normal aqueous formic acid. The reactor is closed, evacuated, and there is charged 200 parts of tetrafluoroethylene. The reactor is then agitated and heated in the temperature range 79°–84° C. for 9 hours, the pressure dropping from 1450 lbs./sq. in. to 1300 lbs./sq. in. There is obtained 17 parts of white granular polytetrafluoroethylene.

The polymerization reaction can be conducted at temperatures from room temperature to about 250° C. but the highest yields are obtained from about 55° to 240° C. and in particular from about 75° to 160° C. Although pressures as low as 500 lbs./sq. in. are operable, the most satisfactory pressures are from 1000 to 4000 lbs./sq. in and the highest pressure, for example, those over 1000 atmospheres, that can be used is limited only by the mechanical difficulties involved. Additional pressure may be applied to the reaction system by the addition of an inert gas, such as carbon dioxide, hydrogen, nitrogen, etc. However, it is to be understood that the mention of the pressure herein refers to partial pressure of the tetrafluoroethylene in the reacting system which must be at least this great. Pressure achieved by adding inert reactants to the system is not a critical factor in operability.

The water is best used in amounts of one part of water to two parts of tetrafluoroethylene. However, the ratio of water to tetrafluoroethylene can range from about .1 to 400 parts of water for each 20 parts of tetrafluoroethylene. It is preferable to carry out the reaction in the presence of an aqueous alkaline medium. The alkalinity may be achieved by use of a wide variety of water-soluble bases, such as the alkali and alkaline earth hydroxides, e. g., NaOH, KOH, Ba(OH)$_2$, Ca(OH)$_2$; the alkali carbonates and bicarbonates, e. g., Na$_2$CO$_3$, NaHCO$_3$, K$_2$CO$_3$, Li$_2$CO$_3$; ammonium hydroxide, carbonate, and in general water soluble salts formed from the alkali and alkaline earth metals and ammonia in combination with weak acids. There can also be employed organic bases, such as aliphatic amines and their salts with weak acids. Depending on the base employed, aqueous solutions containing as much as 40% of the base may be used, but it is preferred to use from 1–10% aqueous solutions.

In addition to oxygen, which is the most effective catalyst in the present process, there can also be used organic peroxy compounds among the most suitable of which are diacyl peroxides, such as diacetyl peroxide, dipropionyl peroxide, dibutyryl peroxide, benzoylacetyl peroxide, and dibenzoyl peroxide. Other peroxy compounds which can be employed include diethyl peroxide, dipropyl peroxide, cyclohexanone peroxide, tetrahydronaphthalene peroxide, and diethyl ether peroxide. Ozone can also be used as the catalyst. The catalyst can be employed in the range of .003–2 weight per cent, based on the monomer, and is preferably used in the range of 0.03–0.3%.

The process is advantageously carried out in a continuous manner, for example, by passing a mixture of tetrafluoroethylene and catalyst, such as oxygen, and water, through a zone which is under polymerizing conditions. This zone is preferably so equipped that the reaction mixture is agitated or subjected to violent turbulence during the polymerizing period. Alternatively, the tetrafluoroethylene and water can be passed into the reaction zone and the catalyst can be injected into the reaction mixture at this point or at several points in the reaction zone. In operating the process in this manner the unreacted tetrafluoroethylene is recycled and that which was converted to polymer is separated after each pass. Continuous operation possesses many advantages, such as the readiness with which unreacted monomer may be reused, accurate control over the reaction conditions, increased operating economy, and flexibility of operation.

The most satisfactory reaction vessels are those constructed of some corrosion resistant material in order to avoid contamination of the polymer with metals or metal salts. For this purpose it is satisfactory to operate in apparatus constructed of or lined with such materials as mild steel, stainless steel, silver, nickel, tantalum, and Hastelloy. Vitreous liners, such as glass and porcelain, may also be employed.

The tetrafluoroethylene polymers find a large number of valuable applications. They can be made into flexible tubing which is well suited to the transport of corrosive liquids and gases. Gaskets and valve packing made of the polymer can likewise be employed to advantage where other materials fail to withstand corrosive attack or elevated temperatures. Pump diaphragms of the polymer can be employed in the pumping of liquids having corrosive or solvent properties which preclude the use of other diaphragm materials. Electrical conductors of all sorts, such as wires, motor armatures such as refrigerator motor armatures, and cables, can be insulated with polytetrafluoroethylene, such insulated conductors being particularly useful because of the inertness of the insulating polymer. Polytetrafluoroethylene bearings are useful in many applications. Container closures, such as bottle cap liners, are also valuable because of their good sealing qualities and inertness to corrosive attack. Containers and vessels may be lined with polytetrafluoroethylene in order to provide said vessels with complete inert lining.

As many apparently widely different embodiments of this invention may be made without departing from the spirit and scope thereof, it is to be understood that I do not limit myself to the specific embodiments thereof except as defined in the appended claims.

I claim:
1. A process for polymerizing tetrafluoroethylene which comprises heating tetrafluoroethylene under a pressure of at least 1000 lbs./sq. in at a temperature of from 55° to 240° C. in the presence of water in substantial amount and a catalyst of the group consisting of oxygen and organic peroxy compounds.

2. The process set forth in claim 1 in which said catalyst is oxygen.

3. The process set forth in claim 1 in which said catalyst is a diacyl peroxide.

ROBERT M. JOYCE, Jr.